(12) United States Patent
McCabe

(10) Patent No.: US 7,146,532 B2
(45) Date of Patent: Dec. 5, 2006

(54) PERSISTENT SESSION AND DATA IN TRANSPARENTLY DISTRIBUTED OBJECTS

(75) Inventor: Harry McCabe, Middletown, NJ (US)

(73) Assignee: Affiniti, Inc., Highlands, NJ (US)

( * ) Notice: Subject to any disclaimer, the term of this patent is extended or adjusted under 35 U.S.C. 154(b) by 364 days.

(21) Appl. No.: 09/777,292

(22) Filed: Feb. 5, 2001

(65) Prior Publication Data
US 2002/0152423 A1 Oct. 17, 2002

(51) Int. Cl.
G06F 11/00 (2006.01)

(52) U.S. Cl. .............. 714/15; 714/43; 714/49; 719/313; 719/315; 709/227

(58) Field of Classification Search ............. 714/15, 714/4, 43, 49; 709/313, 315, 227; 719/313, 719/315, 316
See application file for complete search history.

(56) References Cited

U.S. PATENT DOCUMENTS

| | | | | |
|---|---|---|---|---|
| 5,027,269 A | * | 6/1991 | Grant et al. | 709/224 |
| 5,692,183 A | * | 11/1997 | Hapner et al. | 707/103 R |
| 5,884,316 A | * | 3/1999 | Bernstein et al. | 707/103 R |
| 6,341,312 B1 | * | 1/2002 | French et al. | 709/227 |
| 6,411,954 B1 | * | 6/2002 | Roffe et al. | 707/8 |
| 6,490,624 B1 | * | 12/2002 | Sampson et al. | 709/227 |
| 6,539,422 B1 | * | 3/2003 | Hunt et al. | 709/217 |
| 2003/0163596 A1 | * | 8/2003 | Halter et al. | 709/315 |
| 2004/0025169 A1 | * | 2/2004 | Wiser et al. | 719/315 |
| 2006/0041891 A1 | * | 2/2006 | Aaron | 719/315 |
| 2006/0090164 A1 | * | 4/2006 | Garden et al. | 719/316 |

OTHER PUBLICATIONS

Microsoft Computer Dictionary, 1999, Microsoft Press, 4th Edition, pp. 379.*

* cited by examiner

Primary Examiner—Robert Beausoliel
Assistant Examiner—Christopher McCarthy
(74) Attorney, Agent, or Firm—Morgan, Lewis & Bockius LLP

(57) ABSTRACT

This invention presents a method and system for persistent session and data control across transparently distributed objects. Persistent data control enables a system to reconnect users to the appropriate data areas after a system fault. Persistent session control enables a user to reestablish the state of a previous session with the data, regardless of intervening outages at any one or many parts of the network. The invention uses persistent data objects and persistent data control objects to create persistent sessions and data control across the network.

17 Claims, 6 Drawing Sheets

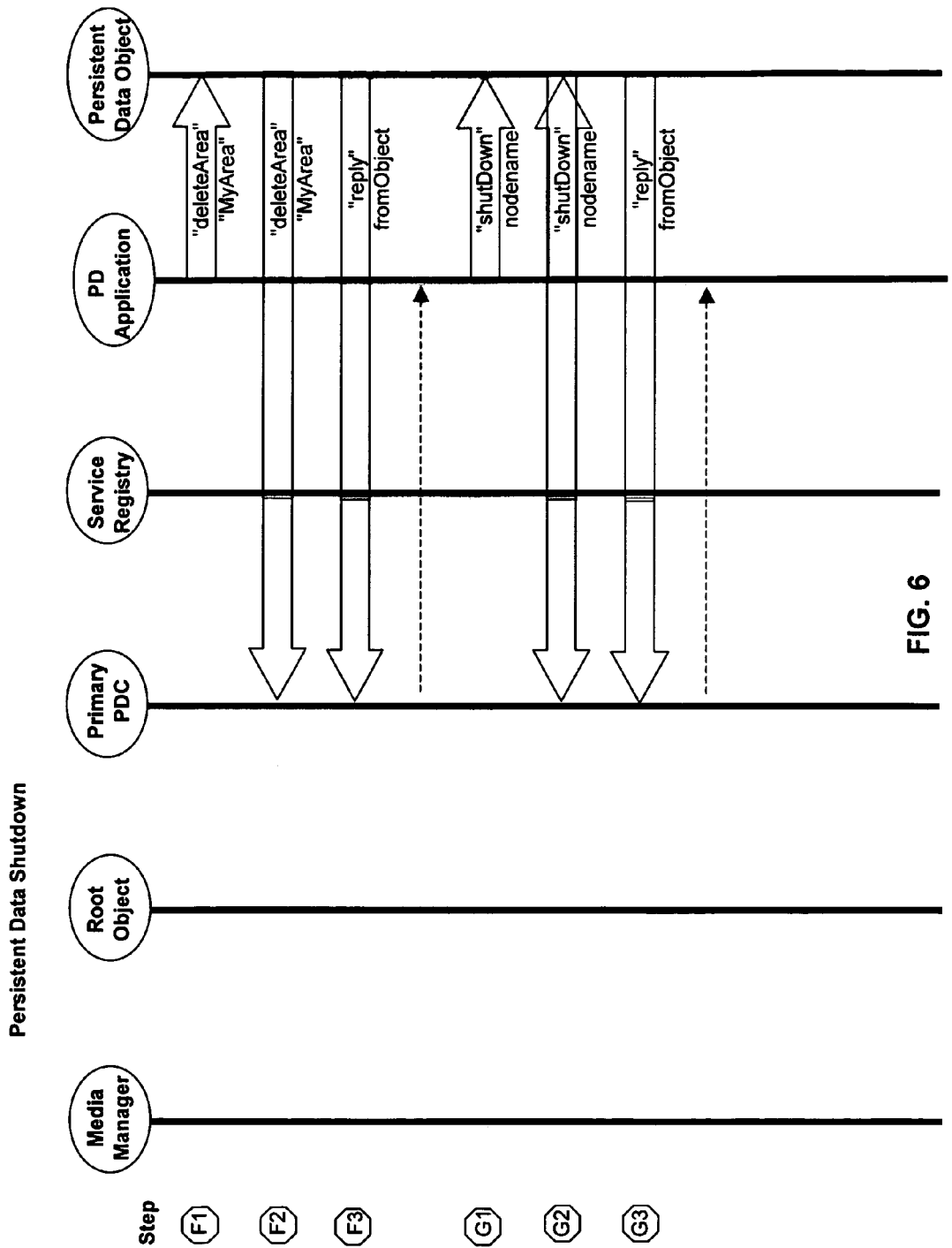

PERSISTENT SESSION AND DATA IN TRANSPARENTLY DISTRIBUTED OBJECTS

BACKGROUND

Persistent data and session control are the abilities of a system to recover session status and data that were "in flight" when a system failure occurs. Session connection and data can be subject to loss due to failures in equipment, software, telecommunication, or other components of the system. For example, if a user is in the middle of a transaction when an interruption in the data source occurs, a database that the user was working in could be left in an ambiguous state. Similarly, when a user loses its connection with a session, the user may not be able to reconnect to the session and data source at the same point it was at before the connection was lost. Systems that can benefit from persistent session and data control include computing systems, software systems, and telecommunication systems.

One issue addressed by persistent data control is the reconnection of users with data. A number of schemes have been developed to address this situation by various manufacturers. Hardware data mirroring is an example of a hardware approach that is used for database recovery. Data mirroring is accomplished by writing each data segment twice on the direct access storage device. The mirroring function can be controlled by either the operating system or the hardware itself depending upon the manufacturer. Mirroring can also be accomplished by using a software approach using software either in the operating system or in the middleware to implement the mirroring function.

There are several drawbacks to these approaches. These techniques can be dependent upon proprietary hardware or proprietary software to ensure that the data is properly copied. For example, direct access storage devices need to be designed specifically to accomplish the data mirroring in the hardware approach. Moreover, because these techniques typically use local storage clusters to perform the backup, in the event of a disaster in the local storage clusters, both the primary data and the copy of the primary data can be lost.

Another technique that has been used to implement persistent data is the use of a single primary controller backed up by a single alternative controller. To implement this method, the system administrator predefines primary and alternate data areas. When the primary controller is brought back into service after the interruption, the data control is switched from the alternative controller back to the primary controller. With this method, it is usually not possible to add a primary controller of an arbitrary disk device type to the hardware cluster mix. Further, when the primary controller is brought back online, it typically has to be attached to the same system where the failure occurred at the same location as the original primary controller.

The Internet has created a second problem for persistent session and data control relating to persistency. Because the HTTP protocol consists of one transmission followed by one response, many data clusters may be involved in each transaction. In the case of a session interruption, it can be unclear which controller needs recovery.

Current data persistent approaches often require proprietary hardware to implement persistency solutions. In these approaches, the system typically has to originate from a particular manufacturer using the correct hardware and the most current operating system for it to properly implement data persistency.

Another limitation in current persistency systems is the equipment and software upon which the persistency is built. Most hardware solutions use data controllers that connect data access storage devices through a limited number of pathways to the hardware channel. Since the number of paths to each device is typically limited to four pathways, only two processors can be connected to each primary/alternate pair of storage devices.

In additional, the fundamental architecture that underlay historical systems were typically designed to accommodate monolithic structuring of applications, such as functional decomposition applications.

SUMMARY OF THE INVENTION

This invention relates to a method and system for persistent session and data control. More particularly, this invention relates to persistent session and data control across transparently distributed objects. Persistent data control enables a system to reconnect users to the appropriate data areas after a system fault. Persistent session control enables a user to reestablish the state of a previous session with the data, regardless of intervening outages at any one or many parts of the network.

In one aspect of this invention, a computerized method to recover session information and data after a change in the system the method is presented. The steps for this method include connecting a persistent data object to a first persistent data control object. Data in a data area is transacted in response to a request by the persistent data object. The first persistent data control object controls the transaction of the data in the data area. The data area is replicated in at least one alternate persistent data control objects. The persistent data objects are connected to an alternate persistent data control object upon notification of the change in the system. The alternate persistent data control object obtains control of the transaction of the data in the data area upon the change in the system.

In another aspect of this invention, the system can include an Application comprised of objects, a System Registry, and a Messaging Scheme. The change in the system can include a failure of the first persistent data control object. The steps of the invention can include the creation of a data area in response to a request by the persistent data object. The first persistent data control object can control the creation of the data area. The persistent data object can be connected to a second persistent data control object.

The data area can be stored in a media device, which can include a memory, hard disc drive, and a networked media device. The session information can be stored in the first persistent data control object and replicated in alternate persistent data control objects. The data area can be replicated in any number of alternate persistent data control objects. When the persistent data object is connected to an alternate persistent data control object, the invention can negotiate with the alternate persistent data control objects using a name-based negotiating method.

The persistent data object can communicate with the first persistent data control object and the alternate persistent data control object through the Messaging Scheme. The Messaging Scheme can determine the change in the system and notify the persistent data object. The change in the system can also include the addition of another alternate data control object, which can be used for end of day archiving in the data area.

The system can determine if there is a change in the system by sending a message to the first persistent data control object to determine the state of the first persistent data control object. The connection of the persistent data object to the alternate persistent data control object can be done transparently to a user. The system can register the persistent data control objects with the System Registry, and allow the persistent data object to find the first persistent data control object by querying the System Registry.

The transaction of data in the data area can be at the request of a user, which sends the request to the persistent data object. The user can include a person, a program, a person using a program, a program using a program, and expanding levels of programs using programs.

In another aspect of this invention, a computer system for recovering session information and data after a change in the system is presented. This system includes a computer comprising a memory and a processor and executable software residing in the computer memory that is operative with the processor. The software allows the system to connect a persistent data object to a first persistent data control object. Data is transacted in a data area in response to a request by the persistent data object. The first persistent data control object controls the transaction of the data in the data area. The software allows for the replication of the data area in at least one alternate persistent data control objects. Finally, the software allows for the connection of the persistent data object to an alternate persistent data control object upon notification of the change in the system. The alternate persistent data control object obtains control of the transaction of the data in the data area upon the change in the system.

In another aspect of this invention, a computer data signal embodied in a digital data stream for recovering session information and data after a change in the system is presented. The computer data signal is generated by a method that includes connecting a persistent data object to a first persistent data control object. Data is transacted in a data area in response to a request by the persistent data object. The first persistent data control object controls the transaction of the data in the data area. The method includes replicating the data area in at least one alternate persistent data control objects. Finally, the method allows the system to connect the persistent data object to an alternate persistent data control object upon notification of the change in the system. The alternate persistent data control object obtains control of the transaction of the data in the data area upon the change in the system.

Advantages of this invention may include one or more of the following. This invention can allow the user to reconnect to a session and restore the session to the state it was in at the time of the interruption. The invention can also provide for replication of transparently distributed user data across controllers in many alternate locations for the purpose of recovery in the event the controller in the primary location disconnected or failed. The invention can also provide for switching of the user session to the appropriate alternate location of the data.

An example of a possible use of this invention is the automatic updating of the terminal of a stock trader even if the terminal is unavailable for a time. Similarly, when a trader conducts trades through a wireless device and loses its signals (e.g., when the trader drives through a tunnel), this invention can automatically update the wireless device to keep the trader informed of any changes.

For instant messaging or chat room applications, this invention can add information to the conversation even while the user is disconnected. The persistent session and data implementation can reestablish the connection to user in the exact state it would have been in had the connection never been lost. Upon reconnection, the information in the application will appear at the same state as if the user never left the session.

BRIEF DESCRIPTION OF THE FIGURES

The foregoing and other features of the present invention will be more readily apparent from the following detailed description and drawings of illustrative embodiments of the invention in which:

FIG. 6 is an object-messenger diagram of the Persistent Data Shutdown.

DETAILED DESCRIPTION

Figure 1:
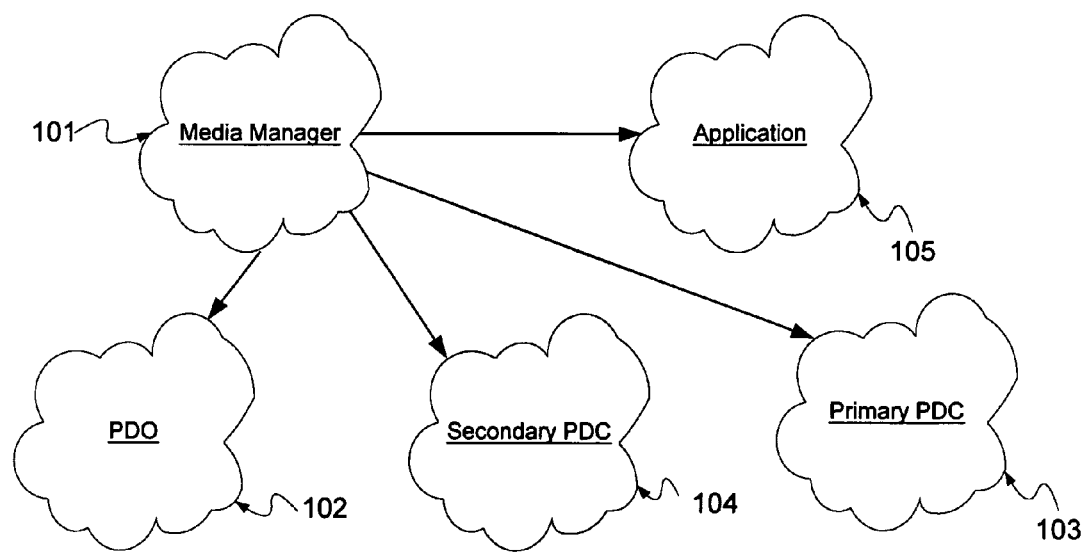
FIG. 1 is an object model of the objects involved in this invention.

This invention relates to a method and system for persistent session and data control. More particularly, this invention relates to persistent session and data control across transparently distributed objects. Persistent data control enables a system to reconnect users to appropriate data areas after a system fault. Persistent session control enables a user to reestablish the state of a previous session with the data, regardless of intervening outages at any one or many parts of the network. The persistent session and data control can be used as an extension on available multi-threading object managers.

For purposes of this disclosure, a user may be a person, a program, a person using a program, a program using a program, or expanding levels of programs using programs. A session is a structured series of interactions between the user, the application, and a data source. From the viewpoint of the processor, a session is known as a "thread" of execution.

Using persistent session and data controls, the system can reconnect a user who has become disconnected within some specified time interval. After reconnection, the user can be fully synchronized to the state the user session would have been in without the interruption. The persistent data control can keep multiple copies of data on alternate controllers to ensure that in the event a primary controller is subject to failure or loss of connection, the alternate controllers can continue with the session. The persistent data control can also allow the system to send data to reconnected users from the appropriate data areas.

This invention can be supported by an application that is decomposed into objects. An object is a collection of data and the functions that operate on that data. By constructing an application out of objects, the objects can be located anywhere in the network without effecting the functioning of the application. Therefore, the user, the application, and the data source can be located on separate computers or servers scattered throughout the network. The sequence of object interactions, known as the thread, controls the current operations on the objects. For purposes of this description, this disclosure assumes that the applications are written in an object-oriented format. Other types of formats can also be used This invention can use a consistent messaging scheme that facilitates the interaction of the objects. This messaging scheme can provide for both the creation and termination of an object, interrogation of the status of the object, activation of the introspective aspects of the object, activation of internal diagnostics of the functional status of the object, invocation of the functions of the object, and management of associated replies of the object. This invention can use a Data Engine, which can provide the runtime environment and allow data and messages to be exchanged between objects. The Data Engine can be implemented using an object or an extension to the programming language used to implement this invention. Objects that communicate through the Data Engine can be registered in a System Registry. The System Registry allows objects to determine the availability and locations of the objects.

This invention can also use a Media Manager, which provides for the graphical application interface and Data Engine interface for command processing. With decomposition of the application into objects and a consistent messaging scheme, an application can be distributed among many locations.

Referring first to FIG. 1, the objects of an embodiment are shown. Upon a command from a user or via startup parameters, the Media Manager 101 calls for the creation of an Application 105, a primary Persistent Data Control object ("PDC") 103, and a secondary Persistent Data Control object 104. The primary PDC 103 controls the data storage for the Application, and the secondary PDC 104 controls a backup area for the data storage for the Application. The creation of the secondary PDC 104 can occur simultaneously or after the creation of the other objects. Additional secondary PDCs can also be created, depending on the needs of the user and the sensitivity of the data. The methods for this embodiment of the PDC are presented in Table 1.

After the creation of the Application 105, it can then create a Persistent Data Object ("PDO") 102. The PDO performs the directing of the traffic between the Application 105 and the PDC 103. The Application 105 can only interface with persistent data through the PDO 102. The methods for this embodiment of the PDO are presented in Table 2.

Figure 4:
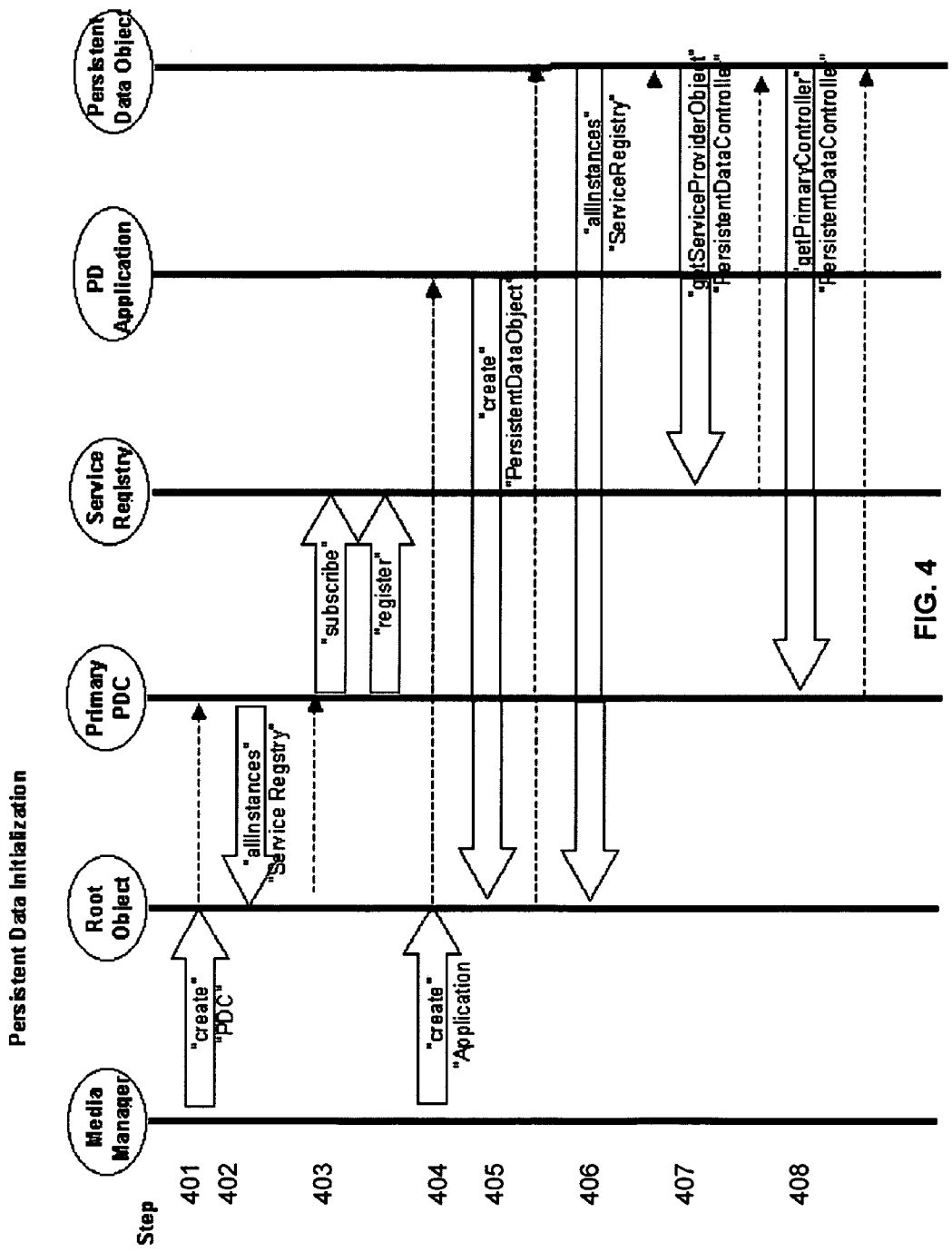
FIG. 4 is an object-messenger diagram of the Persistent Data Initialization.

An illustration of the initialization of this system is given in FIG. 4. The Media Manager creates the primary PDC 401 and Application 405 in parallel as part of system startup activities. The Media Manager calls the "create" methods for each of these objects. After the PDC is created 401, the Primary PDC registers its service with the System Registry 403. After the Application is created 405, the application creates a PDO 406. The PDO queries the Data Engine to find out the System Registry 407. Once the System Registry is known, the PDO gets the name of the primary PDC from the System Registry 408. The PDO then retrieves the PDC 409. Once the PDO retrieves the primary PDC, the Application can begin using the persistent data and storage. FIG. 6 provides an illustration for the shutdown of the system.

One or more secondary PDCs 104 can exist for each primary PDC 103. As the PDCs are created, the PDCs are registered with the system through the System Registry. The registering of the PDCs allows the system to notify all the PDCs of the failure of a PDC or the addition of a new PDC. The location of the primary PDC 103 can vary depending upon the location where the Application 105 is instantiated, while the location of the one or more secondary PDCs 104 can be arbitrary.

Figure 2:
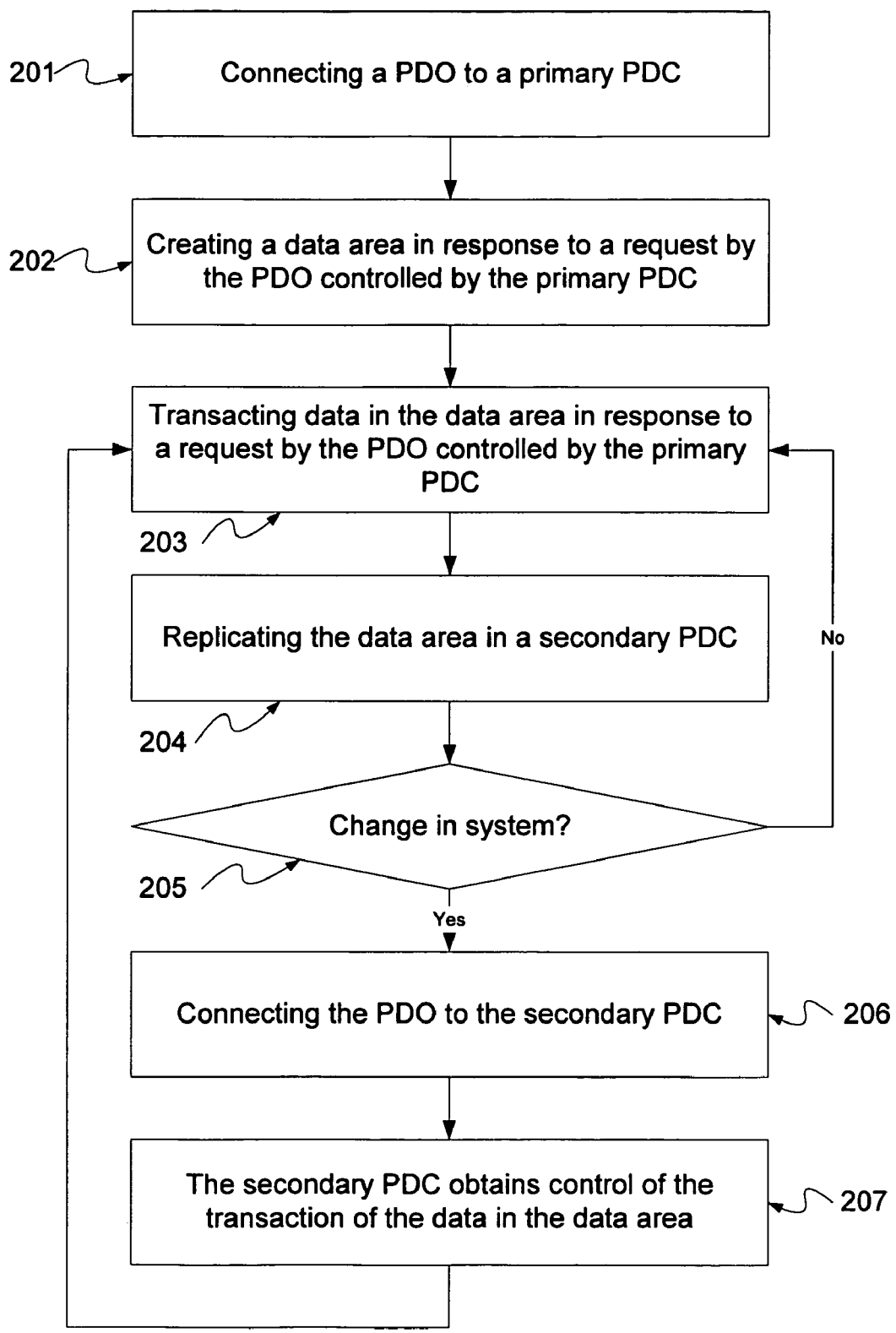
FIG. 2 is a descriptive flowchart of the basic flow of the object interaction.

Referring next to FIG. 2, a flow diagram for an embodiment of this invention is presented. The PDO 102 is connected to the primary PDC 201 and the secondary PDC 202. The user can then request that the PDO 102 create a data area. The PDO 102 passes the data request to the primary PDC 103 and the PDC 103 then creates the data area 202. The data area can be stored in a system's memory or other media, such as a system's hard disc drive. The system's user or user program can request transactions in the data area through the PDO 102, which in turn sends the request to the primary PDC 103. These transactions can include storing, retrieving or deleting information in the data area. The primary PDC 103 handles each transaction in the data area 203. After the creation of a data area or a transaction in the data area by the primary PDC 103, the data area is replicated in one or more alternative PDC 104.

Figure 5:
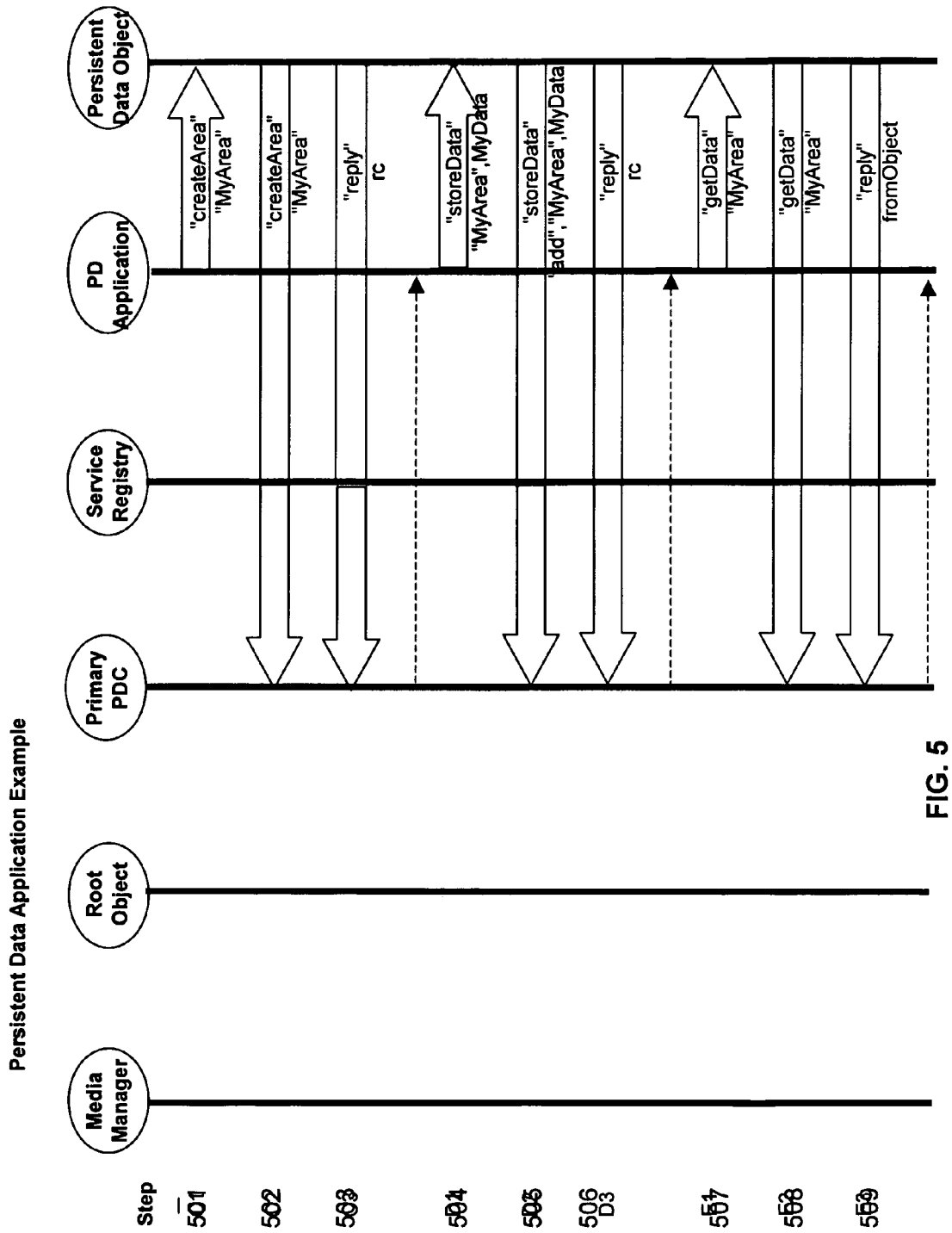
FIG. 5 is an object-messenger diagram of an Application Example.

An illustration of an example of this system is given in FIG. 5. This simple example illustrates how an application creates a data area, stores data in the data area, and retrieves data from the data area. The Application first asks the PDO to create a data area known as "MyArea" 501. The PDO sends this request to the Primary PDC 502 and send the results to the Application 503. The Application requests that the PDO store the data, "MyData," in the data area 504. The PDO requests that the PDC add the requested data to the data area 505 and send the result to the Application 506. The Application can then retrieve the data by asking the PDO to retrieve the data 507. The PDO sends a request to the PDC 508 and send the data back to the Application 509.

Referring back to FIG. 2, after the replication in the secondary PDC, the system can check for a change in the system 205. When there is a change in the system that requires a new primary PDC, the system notifies the PDO 102 of the change. In response, the PDO can switch to an alternate primary PDC (e.g., the secondary PDC 104) to access the data area 206. This switch can be transparent to the invoking application. For example, in the case of a service interruption or a failure of the network hardware, software, or telecommunications in the primary PDC 103, the primary PDC 103 can notify the PDO 102 by unregistering itself. In the case where the primary PDC 103 cannot communicate, the Data Engine connected to the primary PDC 103 can notice its disappearance and notify the PDO 102 that the primary PDC 103 is no longer available. Similarly, the user, by using an appropriate command, can remove the primary PDC 103. In these cases, the PDO can reroute the data from an alternate primary PDC.

Figure 3:
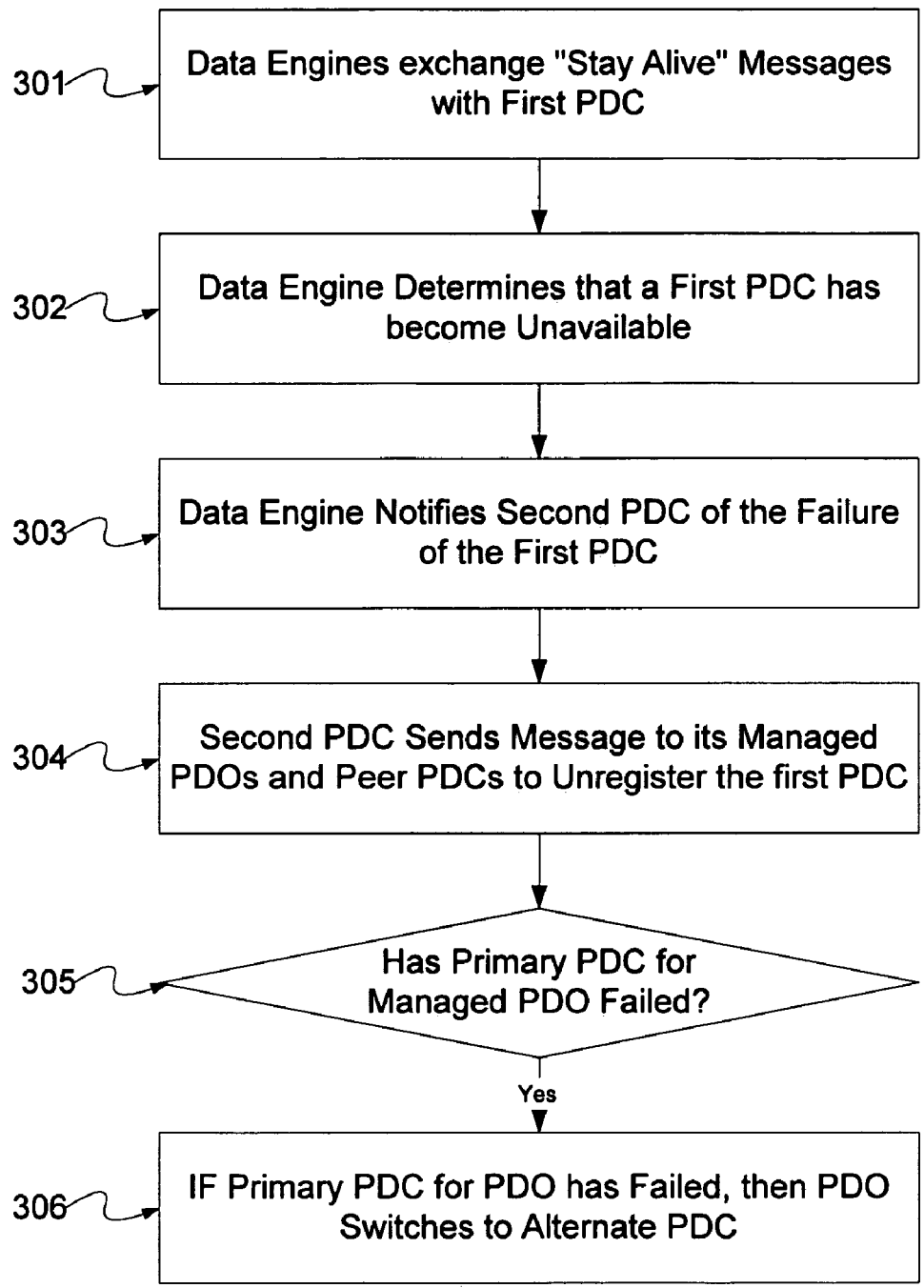
FIG. 3 is an object flowchart of an example of an embodiment of this invention.

Referring now to FIG. 3, an embodiment where there is a transparent switch over to an alternate controller upon failure of the primary PDC is shown. In this situation, communication from the PDO is available to other PDCs. During operation, the Data Engine exchanges "Stay Alive" messages with a first PDC 301. These messages are exchanged to detect a failure in the PDC. In case of a failure of the network hardware, software, or telecommunications, the Data Engine can determine that the first PDC has become unavailable 302. The Data Engine can wait for a specific time interval from a query to the PDC before making this determination.

Once the first PDC is deemed inactive, the surrounding Data Engines can notice the disappearance and send messages to their managed objects and peers to "unregister" the PDC service 303. This information is passed to the PDO, which can perform a switch to an alternate PDC 306 if its primary PDC failed 305. This switch can be transparent to the invoking application.

In the case where the PDO cannot communicate with a PDC, the persistent session does not assume that communication with all data engines is lost. In normal situations, when the Application is communicating with the PDO, the PDO instructs the PDC to send a definite response to the Application. If the response is not received in a predetermined period of time, communication with the PDC is assumed to be lost. In this case, the Application either waits or performs other functions until notified by the Data Engine that the service is available.

This notification occurs within the Data Engine and is accompilshed by the Data Engine sending a "Service Registered" message to the PDO when any PDC is available. The PDO proceeds using the normal startup search sequence to find the lost primary or its alternate. If this cannot be done, then failure notification can be returned to the application.

In the case where the system that holds the PDO itself fails, the persistent session is invoked upon the restart of the Data Engine. Until the PDO is activated by the Application, nothing happens until data is requested. When asked for the data, the data is returned. The PDO is not explicitly notified that the session had been "in flight" when the application was last communicating and is in recovery from an abnormal termination from the PDC's point of view.

As other PDCs come online, the PDCs can announce their service availability to the other members of the network. Negotiation can occur on behalf of each PDO 102 to determine which primary PDC and which alternate PDC will handle the data requirements of that object. The naming convention of the object can be used in this negotiation. In an embodiment, the PDC with the lowest domain name in the collating sequence can win the negotiation and become the primary PDC.

If at any time a new primary data store is added to the data engine mesh, renegotiation can occur. In an embodiment where the PDC with the lowest domain name in collating sequence wins the negotiation, it is possible, with an appropriately chosen name, for a primary PDC to take over the storage functions for the entire network. This technique can be used for end of day archiving.

In some embodiments, objects may announce their availability or non-availability to all nodes on the network at any time. With a large number of objects in the network, this approach can cause a great deal of network traffic. In this case, it is advisable that PDCs notify only their peers that one of their neighbors has failed. A hierarchical "domain" approach to notification can be used in the general case. In this instance, objects may take independent action. For example, a "fire detect sensor" may sound alarms and take other actions.

A number of embodiments of the present invention have been described. Nonetheless, it will be understood that various modifications may be made without departing from the spirit and scope of the invention. For example, the computers or servers upon which the objects interact can include a personal computer executing an operating system such as Microsoft Windows, Unix, or Apple Mac OS, as well as software applications, such as web browsers. The computers can also be terminal devices, a palm-type computer, or a WEB access device that adheres to a point-to-point or network communication protocol such as the Internet protocol. Other examples can include TV WEB browsers, terminals, and wireless access device (such as the 3-Com Palm organizer). The computers may include a processor, RAM and/or ROM memory, a display capability, an input device, and a hard disc or other relatively permanent storage device. Accordingly, other embodiments are within the scope of the claims.

TABLE 1

List of PersistentDataControl Methods

| Method (Function) | Purpose |
| --- | --- |
| _getAdminData | Returns administrative data: number of primary controllers, number of alternate controllers, and timer interval |
| SendMessage | Introspection: show status of messages sent from this persistent data controller |
| create | Create a primary data controller object |
| createArea | Create specific data area |
| debugging | Introspection: entry point for debug |
| delete | Delete this controller object |
| deleteArea | Delete a specific data area |
| getAreaStatus | Introspection: return area status |
| getData | Returns data from data area to invoking object |
| getPrimaryController | Returns name of primary data controller |
| ListUsers | Introspection: return list of users attached to this controller |
| ReceiveMessage | Introspection: display messages sent between persistent data controllers |
| serviceRegistered | Announce service availability to other Data Engines |
| serviceUnregistered | Unregister the controller object |
| SetAdminStatus | Set administrative status: number of primary controllers, number of alternate controllers, and timer intervals |
| ShowStatus | Show status of the local persistent data controller: type, order, and administrator |
| shutDown | Execute shut down upon administrator command |
| storeData | Store data into specific data area |
| storePDStatus | Save status of a persistent data memory |

TABLE 2

List of PersistentDataObject Methods

| Method (Function) | Purpose |
| --- | --- |
| checkpointData | Checkpoint a persistent data memory area |
| create | Create persistent data memory object |
| createArea | Create a new persistent data memory area |
| delete | Delete persistent data memory object |
| deleteArea | Delete a persistent data memory area |
| getAreaStatus | Return status of a persistent data memory area |
| getData | Get data from a persistent data memory area |
| queryDataStatus | Get status on a persistent data memory area |
| retrieveCheckpointData | Get restart information for a persistent data memory area |
| shutDown | Execute shut down upon administrative command |

The invention claimed is:

1. A computerized method to recover session information and data after a change in a network, the method comprising:

connecting a persistent data object to a first persistent data control object;

transacting data in a data area in response to a request by the persistent data object, with the first persistent data control object controlling the transaction of the data in the data area;

dynamically replicating the data area in a plurality of alternate persistent data control objects located anywhere in the network; and connecting the persistent data object to an alternate persistent data control object upon notification of the change in the system, with the alternate persistent data control object obtaining control of the transaction of the data in the data area upon the change in the network.

2. The method of claim 1, wherein the network comprises an Application comprised of objects, a System Registry, and a Messaging Scheme.

3. The method of claim 2, the method further comprising the persistent data object communicating with the first persistent data control object and the alternate persistent data control object through the Messaging Scheme.

4. The method of claim 2, the method further comprising the determining the change in the network by sending a message to the first persistent data control object to determine the current state of the first persistent data control object.

5. The method of claim 1, wherein the change in the network comprises a failure of the first persistent data control object.

6. The method of claim 1, the method further comprising creating a data area in response to a request by the persistent data object, with the first persistent data control object controlling the creation of the data area.

7. The method of claim 1, the method further comprising connecting the persistent data object to a second persistent data control object.

8. The method of claim 1, the method further comprising storing the data area in a media device.

9. The method of claim 8, wherein the media device is chosen from the list consisting of a memory, hard disc drive, and a networked media device.

10. The method of claim 1, wherein session information is stored in the first persistent data control object and replicated in alternate persistent data control objects.

11. The method of claim 1, wherein the connection of the persistent data object to the alternate persistent data control object is done transparently to a user.

12. The method of claim 1, the method further comprising requesting a transaction of data in the data area by a user, with the user sending the request to the persistent data object.

13. The method of claim 12, wherein the user is selected from the list consisting of a person, a program, a person using a program, a program using a program, and expanding levels of programs using programs.

14. A computerized method to recover session information and data after a change in a network, the method comprising:
    connecting a persistent data object to a first persistent data control object;
    transacting data in a data area in response to a request by the persistent data object, with the first persistent data control object controlling the transaction of the data in the data area;
    dynamically replicating the data area in at least one alternate persistent data control object located anywhere in the network; and
    connecting the persistent data object to an alternate persistent data control object upon notification of the change in the system, with the alternate persistent data control object obtaining control of the transaction of the data in the data area upon the change in the network;
    wherein the connecting the persistent data object to an alternate persistent data control object additionally comprises negotiating the alternate persistent data control object; and wherein the negotiating the alternate persistent data control object comprises using a name-based negotiating method.

15. A computerized method to recover session information and data after a change in a network, the method comprising:
    connecting a persistent data object to a first persistent data control object;
    transacting data in a data area in response to a request by the persistent data object, with the first persistent data control object controlling the transaction of the data in the data area;
    dynamically replicating the data area in at least one alternate persistent data control object located anywhere in the network; and
    connecting the persistent data object to an alternate persistent data control object upon notification of the change in the system, with the alternate persistent data control object obtaining control of the transaction of the data in the data area upon the change in the network;
    wherein the change in the network additionally comprises adding an additional alternate data control object.

16. A computerized method to recover session information and data after a change in a network, the method comprising:
    connecting a persistent data object to a first persistent data control object;
    transacting data in a data area in response to a request by the persistent data object, with the first persistent data control object controlling the transaction of the data in the data area;
    dynamically replicating the data area in at least one alternate persistent data control object located anywhere in the network; and
    connecting the persistent data object to an alternate persistent data control object upon notification of the change in the system, with the alternate persistent data control object obtaining control of the transaction of the data in the data area upon the change in the network;
    wherein the network comprises an Application comprised of objects, a System Registry, and a Messaging Scheme that determines the change in the network and notifies the persistent data object;
    wherein an additional alternate data control object is used for end of day archiving of the data area.

17. A computerized method to recover session information and data after a change in a network, the method comprising:
    connecting a persistent data object to a first persistent data control object;
    transacting data in a data area in response to a request by the persistent data object, with the first persistent data control object controlling the transaction of the data in the data area;
    dynamically replicating the data area in at least one alternate persistent data control object located anywhere in the network; and
    connecting the persistent data object to an alternate persistent data control object upon notification of the change in the system, with the alternate persistent data control object obtaining control of the transaction of the data in the data area upon the change in the network;
    wherein the network comprises an Application comprised of objects, a System Registry, and a Messaging Scheme;
    the method further comprising registering the persistent data control objects with the System Registry, and finding the first persistent data control object by querying the System Registry.

* * * * *

UNITED STATES PATENT AND TRADEMARK OFFICE
CERTIFICATE OF CORRECTION

PATENT NO. : 7,146,532 B2  Page 1 of 1
APPLICATION NO. : 09/777292
DATED : December 5, 2006
INVENTOR(S) : Harry McCabe It is certified that error appears in the above-identified patent and that said Letters Patent is hereby corrected as shown below:

Claim 1, Column 8, Line 65, be corrected as follows:

"system" should be changed to --network--

Signed and Sealed this

Fifth Day of January, 2010

David J. Kappos
*Director of the United States Patent and Trademark Office*